Oct. 17, 1933.   A. P. DAVIDSON   1,930,967
INCUBATOR
Filed June 11, 1930   4 Sheets-Sheet 1

INVENTOR.
Albert P. Davidson.
BY
ATTORNEY

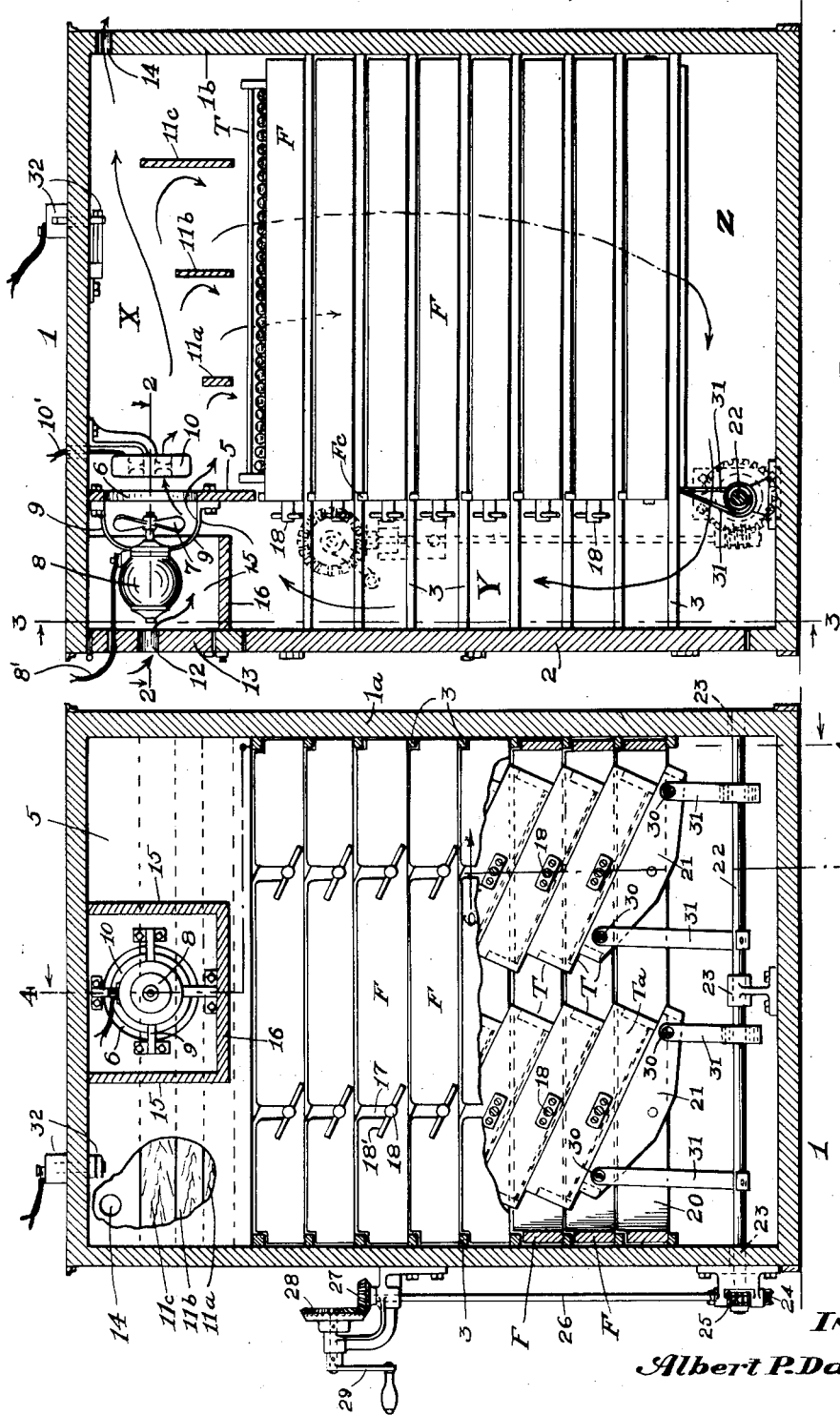

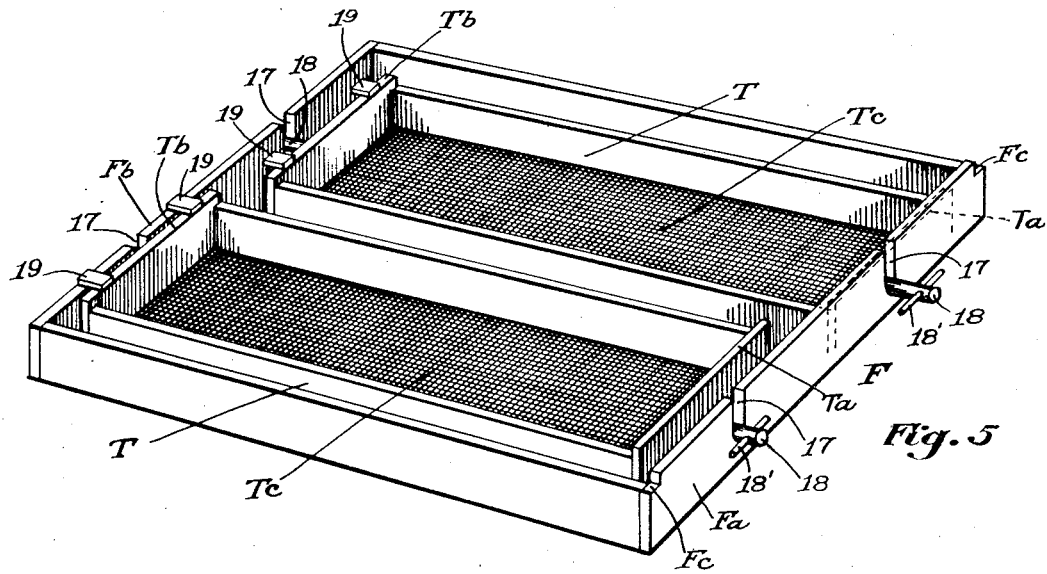
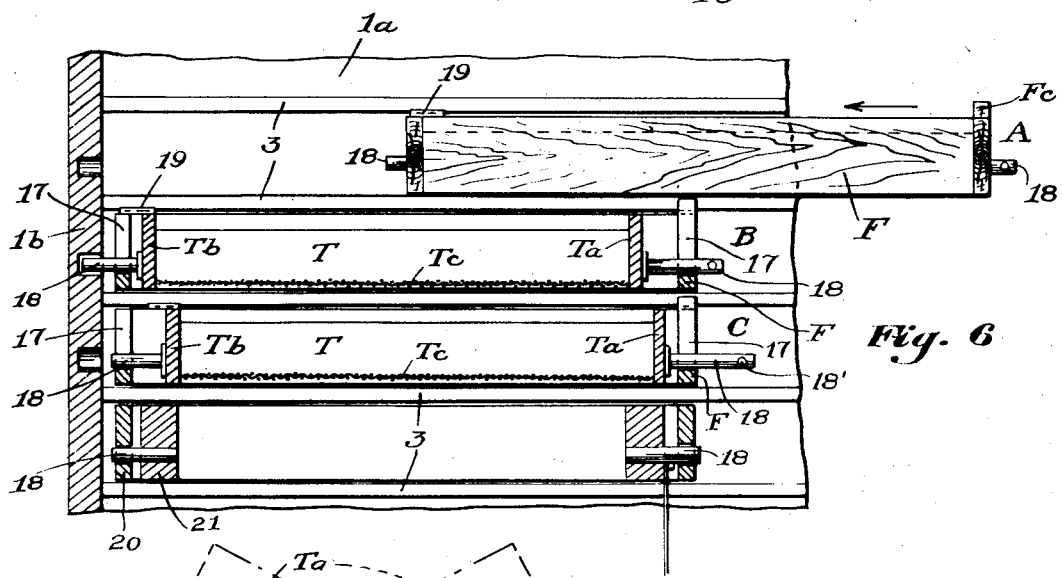
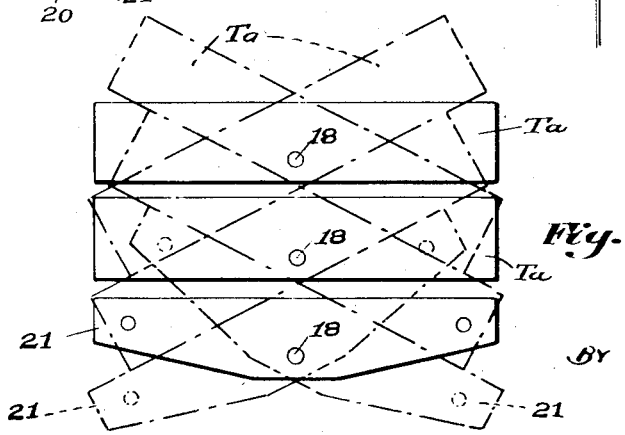

Patented Oct. 17, 1933

1,930,967

UNITED STATES PATENT OFFICE 1,930,967

INCUBATOR

Albert Porter Davidson, Center Conway, N. H.

Application June 11, 1930. Serial No. 460,432

17 Claims. (Cl. 119—37)

This invention represents a development of and an improvement upon the general type of incubator disclosed in my co-pending application, Serial No. 298,911, filed August 11, 1928. The present invention deals with a modified method and apparatus for heating and circulating the air downwardly through the egg trays and back to the air heating unit, and further provides for the tilting of the egg trays so that the position of the eggs may be varied at intervals in order that all parts thereof may be presented to the circulated warm air and maintained in an uniformly heated condition throughout. In the old style incubator, the eggs were turned by hand which required that the trays be removed from the incubating chamber and resulted not only in a loss of heat, but the loss of many eggs as well.

The arrangement of the trays and means for tilting the same represent an improvement both in structure and final satisfactory result from mechanical egg tilting apparatus heretofore embodied in structures of the prior art which in combination with my novel method of and apparatus for distributing the air throughout the tray stacks represents a greatly improved incubator.

The tilting apparatus heretofore commonly employed have required that the trays be suspended from a vertical support which was manipulated to tip the trays to the desired extent and this necessarily required involved mechanism requiring special care and adjustment. If the trays were provided with a protecting frame, that frame also was tilted with the trays. In my present invention, the tray frames or supports are rigid and the tipping of the individual trays is possible without removing the tray from the frame or tilting the frame itself. By the simple means employed in my tray tilting apparatus each series of superimposed trays is tilted within predetermined limits with a great saving in material as well as avoiding the need of complicated operating means.

Throughout the specification and drawings like reference numerals are employed to indicate the corresponding parts.

In the drawings:

Fig. 3 is a transverse sectional elevation taken on line 3—3, Fig. 4.

Fig. 4 is a longitudinal sectional elevation taken on line 4—4, Fig. 3.

Fig. 5 is a perspective of a frame in which are mounted two egg trays.

Fig. 6 is a fragmentary longitudinal sectional elevation of the incubator on the line 6—6, Fig. 3, showing a frame being placed in position and the trays in horizontal position.

Fig. 7 is a diagrammatical end view of a plurality of the egg trays and the operating platform depicted in horizontal and two oppositely tilted positions.

Figure 1:
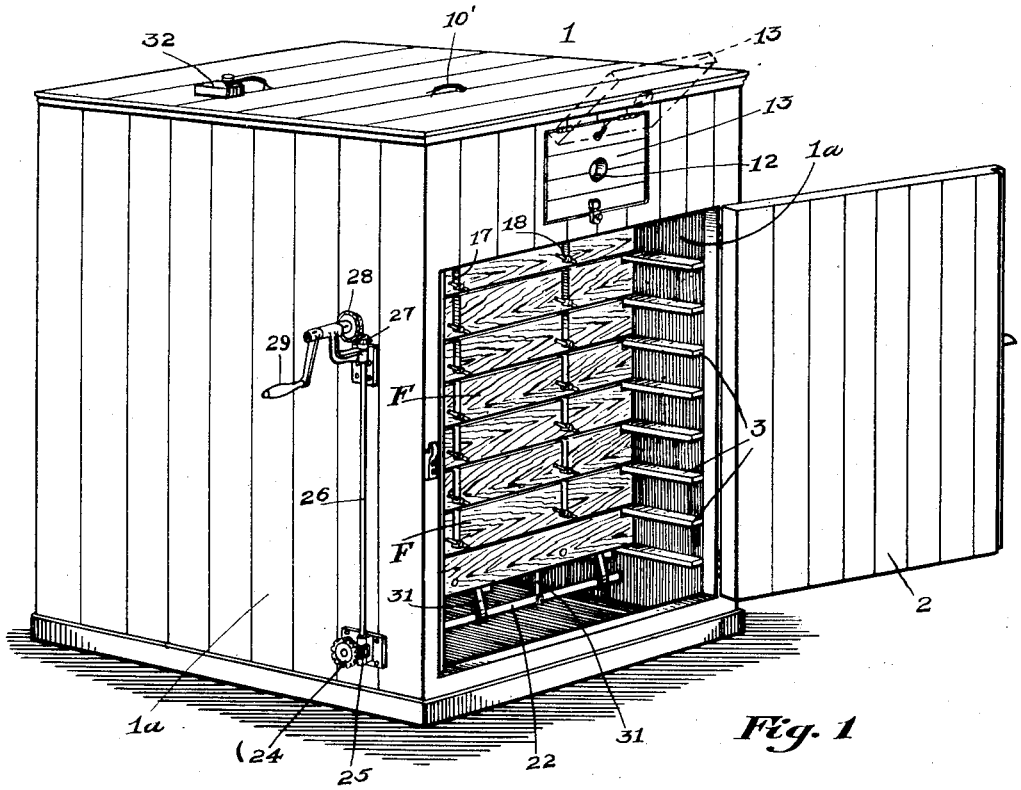
Fig. 1 is a perspective view of my incubator.
Figure 2:
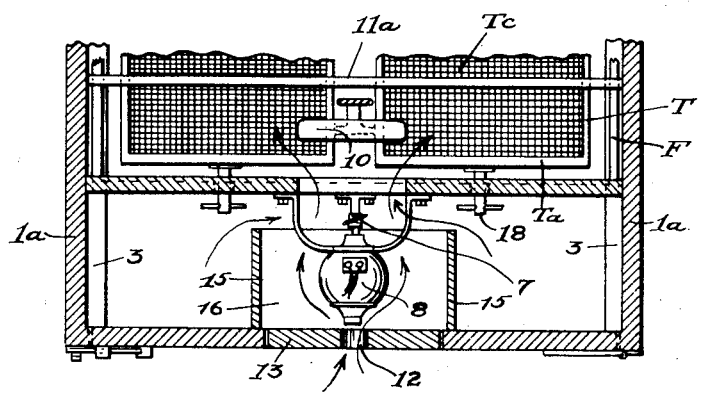
Fig. 2 is a fragmentary plan view, partly in section taken on line 2—2, Fig. 4.
Figure 8:
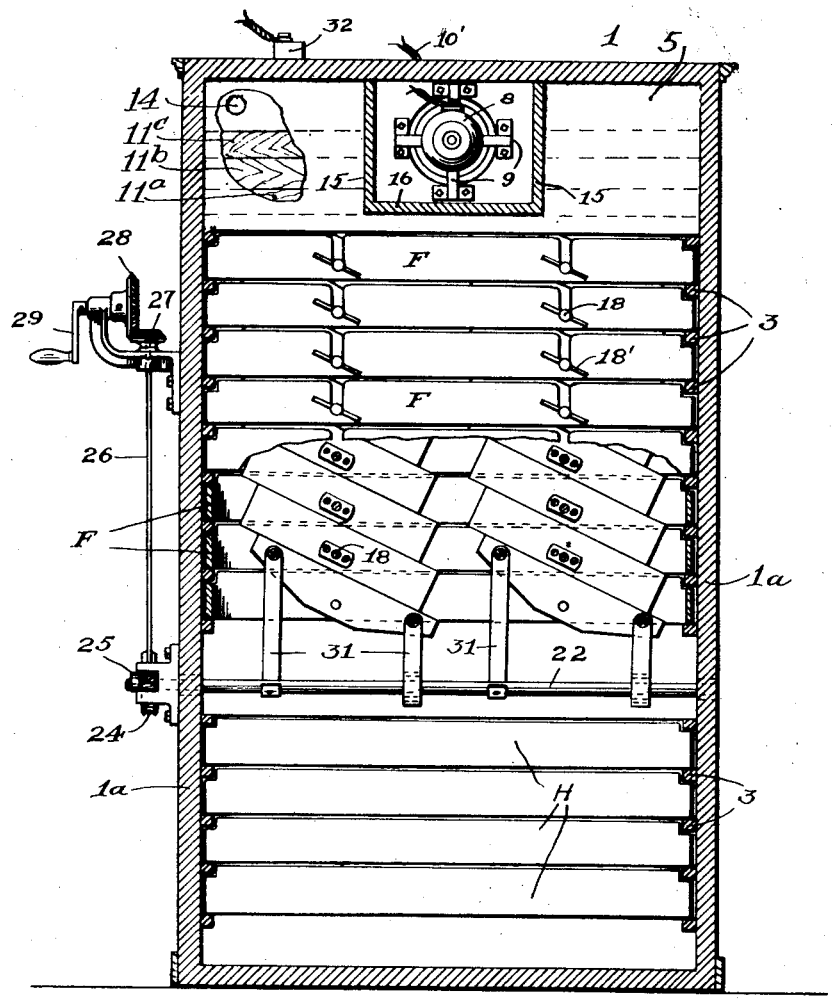
Fig. 8 is a view similar to Fig. 3 but showing a modified type of tray for the hatching eggs.

Referring to the drawings, 1 represents, generally, the outside structure or body of the incubator and 2 the door for the opening through which access is had to the interior for loading or unloading the egg trays.

Secured to its side walls, interiorly of the incubator, are a plurality of horizontally disposed, vertically spaced battens or rails 3 upon which the tray-carrying frames are supported and upon which the frames may slide while being placed in or removed from the incubator.

I extend these rails for the full length of the side walls 1a in order that better support may be given a frame when a considerable portion of its length projects outwardly from the incubator, in which position the egg trays may be placed in or removed from the frame without the necessity of completely withdrawing it from the incubator.

Within the upper interior portion of the incubator is a transverse partition 5 in which is a relatively large opening 6. Rearwardly of this partition a chamber X is provided which serves as the initial heating compartment of the incubator.

Aligning with the opening 6, on the opposite side of the partition 5, is a fan wheel 7 operated by an electric motor 8 receiving current through the line wires 8' and supported by brackets 9. Within the chamber X and disposed adjacent the opening 6 is an electric heating unit 10, current for operating which is supplied through the line wires 10'. While in this instance I have elected to employ electricity as the heat generating medium, it is obvious that steam heating coils, hot air from outside sources or any other means for raising the temperature of the air in the chamber X may be substituted.

Spaced at intervals in the heating chamber X are other transverse partitions, 11a, 11b, and 11c, progressively increasing in height as the rear end of the incubator is approached. These partitions serve as means to deflect and divide the current of air blown by the fan wheel and distribute it more uniformly over the whole surface of the egg trays.

Air to the interior of the incubator is admitted through the opening 12 made in the door 13, the latter being provided for the purpose of obtaining access to the motor 8. A vent opening 14 in the rear wall 1b serves as an exit for foul air and assists materially in the general air circulatory system.

The motor 8 is partially enclosed in a chamber bounded by the vertical, longitudinally disposed partitions 15, 15 and the horizontal, transverse floor element 16, the latter joining the two members 15. A space intervenes between the ends of the members 15 and 16 and the partition 5 for a purpose hereinafter to be explained.

In Fig. 5 I show one of the egg-tray-carrying frames with two egg trays mounted therein. The frame, designated as a whole by the character F is rectangular in shape with open top and bottom. The front end, Fa, and rear end Fb have open end slots 17 in which to receive the trunnions 18 projecting from the end portions Ta and Tb of the egg tray T. It will be observed that these trunnions are located on the egg trays at points, vertically, below the centre line through their end portions. This has the effect of throwing them out of balance and conduces to a more rapid tilting when once they start to incline than if they were pivoted on their centers of gravity.

The trays are equipped with coarse screen bottoms Tc so that air may freely circulate from the heating chamber downwardly through the whole tier of trays. The end portions Ta and Tb extend below the wire a distance, approximately one-half to three-fourths of an inch. This not only reinforces the frame but lessens the necessary depth of the slot 17 in which the trunnions 18 rotate.

On the end Tb of each tray are lugs 19. While the portions Tb and Fb of the tray and frame, respectively, are in closest relation, as seen at frame B, Fig. 6, these lugs lie on the top of the member Fb, thereby preventing rotation of the tray in the frame. This relation between tray and frame is maintained during the operation of filling the incubator with the egg-holding elements (see Fig. 6, at A); but upon its completion all the trays in the respective frames are advanced into the position shown at C, Fig. 6, and at the right hand tray in Fig. 5, in which positions the trays are capable of being rotated on their trunnions. The trays are drawn forwardly by the use of the handles 18'.

I will now describe the method and mechanism by which the rotating or tilting of the trays is accomplished.

Beneath the lowermost tray-carrying frame F is a frame 20, to all appearances the counterpart of frame F except it is devoid of the slots 17. Within this frame 20 is a revoluble platform 21 which, as a matter of fact may be and preferably is made in the form of a tray itself. The platform is pivoted in its frame in substantially the same manner as are the egg trays in their respective frames, except that in this instance there is no reciprocatory or end-wise movement between frame and platform.

In Fig. 7 the full lines depict the positions, relatively, of the trays and platform previously to tilting them, and when rotated, in either direction, so that the portions Ta and Tb of the trays abut, no further movement in the direction of rotation is possible.

Referring to Figs. 1 and 3, 22 is a horizontal shaft journaled in bearings 23. On one end of this shaft is a worm gear 24, engaging which is a worm 25 which is fixed on the vertical shaft 26. A bevel pinion is secured on the opposite end of the shaft 26 and this pinion operates in conjunction with the bevel gear 28 the rotation of which latter is controlled by a crank handle 29.

Loosely operating, respectively, over studs 30 in the platform 21 are two straps 31, the lower ends of which are secured on opposite sides of the shaft 22. Thus when the shaft is rotated in one direction, one strap is winding on and the other is unwinding from the shaft, the strap which is winding being the one which actuates the platform and draws that end to which it is attached, downwardly. Thus by manipulating the crank handle 29 and rotating it, first in one direction and then in the reverse, the platform and egg trays may be made to tilt accordingly, alternately dipping in one and then in the other direction from their horizontal positions, at which location they and the frames F may be removed from the incubator.

I am well aware of the fact that in winding and unwinding the two straps, the speed at which they move varies except at that particular point when an equal amount of each strap overlies the shaft. Stated in other words, when one turn of one strap is wound over the shaft and two or more turns of the other strap forms the drum over which the strap is winding, the one with the most turns will travel faster than the other.

To compensate for this inconstancy or lack of uniformity in relative winding speeds of the two straps, I adjust them with the parts positioned as shown in Fig. 3 so that the two straps are of substantially equal tautness, and, being of the same length, when the straps which are shown unwound start to wind, they will maintain this tautness throughout the winding operation, or until conditions with respect to the positions of the parts, conversely to that shown, prevail.

It will be observed that by employing a worm gear drive for the shaft 22 the strain on the strap which connects with the lower end of the platform, for the time being the "pulling" strap, is automatically maintained for the reason that the gear is locked against rotation by the worm.

In lieu of the straps 31 I may use a wire rope which might in size be of one-eighth to one-quarter of an inch. With wire rope the coils would not wind on top of each other and there would be no need for equalizing mechanism. Either straps or wire rope may be utilized in my machine. While I have shown the shaft 22 and operating parts near the front of the trays it will be understood that these may as effectively be positioned at the rear. In fact there is advantage in so positioning these parts as by so doing the space in front of the trays would be left clear for a moisture pan if need be.

In arranging the frames F in the incubator it is desirable, in so far as is possible, that their front ends present a continuous surface, constituting to all intents and purposes a partition bounding on one side the chamber Y. It is necessary, however, in order to insert the frames F in the incubator to notch the top corners, at Fc, so that the upwardly extending front ends of the frames may clear the rails 3 as they are moved into the incubator to the depth of the chamber Y. Thus, with a substantially closed end to the vertical tier of frames, aligning with the partition 5, the heated air from the chamber X may pass downwardly through the whole assembly of trays and frames into the chamber Z and thence toward the front end and upwardly through the chamber Y. By leaving a space between the inner ends of the motor chamber elements 15 and 16 the current of air continues and again enters the chamber X by way of the opening 6 completely and effectively circulating throughout the whole apparatus.

To regulate and control the temperature of the interior of the incubator I employ a thermostatically operated switch mechanism 32, placing it, preferably within the chamber X.

The hatching trays H in the small or single tiered machines such as are illustrated in the drawings are disposed under the tilting mechanism. These may embody the same general type of trays as the trays T but of greater depth in order to provide head room for the chick, or I may use a single large hatching tray which extends across the housing from wall to wall.

My invention is capable of being embodied in a compartment incubator in which a plurality of sections similar to that disclosed in Fig. 1 may be arranged end to end or at right angles to each other. In this case I should provide an entire section devoted to hatching in which the hatching trays H of satisfactory depth may all be brought together. This would be of advantage not only in convenience of handling the trays and chicks but would keep the loose down of the chicks away from the incubating eggs which would greatly improve the sanitation of the incubators. In such an assembly the hatching trays might be of the type of tray illustrated or instead of two trays I would preferably use one large tray which would extend from wall to wall of the housing and bear on the cleats or rails 3. With such an incubating tray a frame is unnecessary as the horizontal edges of the adjoining trays would abut and provide a wall for the air return passage Y.

I claim:

1. In an incubator comprising a walled housing provided with air inlet and outlet openings, a series of superimposed tray supports mounted on opposite walls of said housing and spaced from top and bottom thereof to leave chambers above and below the same and spaced from one wall of said housing whereby a passage is defined between said wall and supports a series of superimposed egg trays removably mounted on said supports, means for heating the air within said top chamber disposed adjacent the air inlet opening and offset as to said top chamber, and means carried by said housing and disposed between said heating unit and said air inlet opening to drive a current of fresh air against said heating unit, and means in the top chamber adapted to distribute the air evenly throughout said trays.

2. In an incubator comprising a walled housing provided with air inlet and outlet openings, a series of tray supports mounted on opposite walls of said housing and spaced from top and bottom thereof to leave chambers above and below the tray stacks, and spaced from one wall of said housing whereby a passage is defined between said wall and egg tray supports, a series of superimposed egg trays removably mounted in said supports, means for heating the air within said top chamber disposed adjacent the air inlet opening laterally of said top chamber, a fan between said heating unit and said air inlet opening to drive a current of fresh air against said heating unit, and baffle plates in said top chamber inwardly of said air heating means to cause an even distribution of the air through said trays, said air returning to said top chamber through said passage.

3. In an incubator comprising a walled housing provided with air inlet and outlet openings, a series of tray supports mounted on opposite walls of said housing and spaced from top and bottom thereof to leave chambers above and below the tray stack, and spaced from one wall of said housing whereby a passage is defined between said wall and egg tray supports, egg trays removably mounted in said supports, means for heating the air within said top chamber disposed adjacent the air inlet opening laterally of said top chamber, a fan between said heating unit and said air inlet opening to drive a current of fresh air against said heating unit, baffle plates in said top chamber to cause an even distribution of the air through said trays, and a partition beneath said fan and said air opening and above said return air passage whereby the air returning through said passage is guided into said top chamber and is again distributed downwardly through said egg trays.

4. In an incubator comprising a walled housing provided with air inlet and outlet openings, a series of superimposed tray supports mounted on opposite walls of said housing and spaced from top and bottom thereof to leave chambers above and below the tray stack, and spaced from one wall of said housing whereby a passage is defined between said wall and egg tray supports, a series of superimposed egg trays removably mounted on said tray supports, means for heating the air within said top chamber comprising an electrical heating unit disposed adjacent the air inlet opening and laterally of said top chamber, a fan between said heating unit and said air inlet opening to drive a current of fresh air against said heating unit, baffle plates of increasing height as they are distant from said fan in said top chamber to cause an even distribution of the air through said tray stack, and a thermostat in said top chamber electrically connected to said heating unit to turn off said heater when a predetermined temperature is reached.

5. In an incubator, comprising a walled housing, and an egg tray carrying frame supported thereby, an egg tray secured in said carrying frame, the front and rear ends of said frame having open-ended slots, said tray having rearwardly extending lugs adapted to overlie the top of the frame member during the operation of filling the incubator, trunnions carried by said egg tray and lying in a plane coincident with a vertical plane passing through the longitudinal median line of the tray, said trunnions extending from the end portions of said tray and adapted to bear in said open-ended slots in said tray frame, said trunnions being adapted to throw said tray out of balance and cause a rapid tilting thereof once it is inclined from the horizontal, and a member carried by said tray whereby said lugs are removed from the rear ends of said frame and said tray returned to tiltable position in said frame.

6. In an incubator comprising a walled housing, a series of superimposed tray supports carried by opposite walls of said housing, a series of superimposed egg trays mounted on said supports, said trays being tiltable in said supports, and tray tilting means comprising a frame positioned beneath said tray supports, a pivotal platform in said frame, said series of trays being superimposed on said platform, bearings carried by said incubator housing, a horizontal shaft journaled in said bearings, means for rotating said shaft, and means carried by said platform and engaging said shaft whereby said trays are tilted according to the rotation of said shaft.

7. In an incubator comprising a walled housing, a series of superimposed tray supports carried by opposite walls of said housing, a series of superimposed egg trays mounted on said supports, said trays being tiltable in said supports, and tray tilting means comprising a frame positioned beneath said tray supports, a pivotal platform in said frame, said series of trays being superimposed on said platform, bearings carried by said incubator housing, a horizontal shaft journaled in said bearings, means for rotating said shaft, and means carried by said platform and engaging said shaft whereby said trays are tilted according to the rotation of said shaft, said means limiting the rotation of said shaft in either direction.

8. In an incubator comprising a walled housing, a series of superimposed tray supports carried by opposite walls of said housing, a series of superimposed egg trays mounted on said supports, said trays being tiltable in said supports, and tray tilting means comprising a frame positioned beneath said tray supports, a pivotal platform in said frame, said series of trays being superimposed on said platform, a horizontal shaft rotatably journaled in said casing, means for rotating said shaft, and a flexible member having one end secured to said platform, and its other secured to said shaft whereby as said shaft is rotated in one direction said member is wound around said shaft, and when rotated in the opposite direction is unwound and said platform and superimposed egg trays are tilted accordingly, and means for returning said platform and trays to horizontal position and tilting the same in the opposite direction as said member is unwound from said shaft.

9. In an incubator comprising a walled housing, a series of superimposed egg trays tiltably mounted in said housing, and tray tilting means comprising a pivotal platform, said series of trays being superimposed on said platform, a horizontal shaft rotatably journaled in said casing, means for rotating said shaft, and a flexible member having one end secured to said platform and its other end secured to said shaft whereby when said shaft is rotated in one direction said member is wound about said shaft and when rotated in the opposite direction is unwound from said shaft, and said platform and superimposed egg trays are tilted accordingly, and means for returning said platform and tray to horizontal position and tilting them in the opposite direction as said member is unwound from said shaft.

10. In an incubator comprising a walled housing, a series of superimposed egg trays tiltably mounted in said housing, and tray tilting means comprising a pivotal platform beneath said trays, said series of trays being superimposed on said platform, a horizontal shaft journaled in said casing, and means for rotating said shaft, a pair of flexible members, one secured to either end of said platform, the lower ends of said straps being secured on opposite sides of said shaft whereby when said shaft is rotated in one direction one strap is winding around and the other is unwinding from said shaft, and said platform and superimposed egg trays are made to tilt accordingly.

11. In an incubator comprising a walled housing, a series of superimposed tray supports carried by opposite walls of said housing, a series of superimposed egg trays mounted on said supports, said trays being tiltable in said supports, a pivotal platform, said series of trays being superimposed on said platform, a horizontal shaft rotatably journaled in said casing and means for rotating said shaft, a pair of flexible members, one secured to either end of said platform, the lower ends of said members being secured on opposite sides of said shaft whereby when said shaft is rotated in one direction one member is winding around and the other is unwinding from said shaft, and said platform and superimposed egg trays are made to tilt accordingly.

12. In an incubator comprising a walled housing, a series of superimposed tray supports carried by opposite walls of said housing, a series of superimposed egg trays mounted on said supports, said trays being tiltable in said supports, and tray tilting means comprising a frame positioned beneath said tray supports, a pivotal platform in said frame, said series of trays being superimposed on said platform, bearings carried by said incubator casing, a horizontal shaft, and a pair of straps, one secured to either end of said platform, the lower ends of said straps being secured on opposite sides of said shaft whereby when said shaft is rotated in one direction one strap is winding around and the other is unwinding from said shaft, and said platform and superimposed egg trays are made to tilt accordingly.

13. In an incubator comprising a walled housing, an egg tray carrying frame mounted on said housing, an egg tray in said frame, said tray having rearwardly extending lugs adapted to overlie the frame during the operation of filling the incubator, and means whereby said lugs are placed over and removed from said frame.

14. In an incubator comprising a walled housing, an egg tray carrying frame mounted on said housing, the front and rear ends of said frame having open-ended slots, an egg tray secured in said egg frame, said tray having rearwardly extending lugs adapted to overlie the frame during the operation of filling the incubator, means carried by said tray and extending from the ends thereof adapted to turn in said open ended slots in said frame and means whereby said lugs are removed from the rear ends of said frame and said tray returned to tiltable position in said frame.

15. In an incubator comprising a walled housing, an egg tray carrying frame mounted on said housing, the front and rear ends of said frame having open-ended slots, an egg tray in said frame, said tray having rearwardly extending lugs adapted to overlie the rear end of said frame during the operation of filling the incubator, trunnions carried by said egg tray and lying in a plane coincident with a vertical plane passing through the longitudinal median line of the tray and extending from the ends of the tray and adapted to turn in said open ended slots, and means whereby said lugs are removed from the rear ends of said frame and said tray returned to tiltable position in said frame.

16. An incubator comprising a walled housing, a tray support mounted on opposite walls of said housing and having open ended slots in its front and rear ends, said housing having a pocket in alignment with the slot in the rear end of the tray support, an egg tray removably mounted on said support, trunnions extending from the front and rear ends of the egg tray adapted to bear in said slots, said rearwardly extending trunnion having its end in said pocket, and means for turning said trunnions in said slots thereby to turn said tray in its support 17. An incubator comprising a walled housing, a series of superimposed tray supports mounted on opposite walls of said housing and having open ended slots in their front and rear ends, a series of superimposed egg trays removably mounted on said supports and having end, side and bottom members, trunnions projecting from the ends of the trays at points below the centres of gravity thereof and turnable in said slots, the ends of said trays extending below the bottoms a predetermined amount whereby the trays are spaced from each other the distance required to limit the tilting of the trays in either direction.

ALBERT PORTER DAVIDSON.